(12) United States Patent   (10) Patent No.: US 6,504,635 B1
Nakashima                    (45) Date of Patent:    Jan. 7, 2003

(54) IRDA MODULATION/DEMODULATION INTEGRATED CIRCUIT DEVICE (75) Inventor: Takayuki Nakashima, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 0 days.

(21) Appl. No.: 09/381,636
(22) PCT Filed: Mar. 26, 1998
(86) PCT No.: PCT/JP98/01384
§ 371 (c)(1),
(2), (4) Date: Dec. 10, 1999
(87) PCT Pub. No.: WO98/44658
PCT Pub. Date: Oct. 8, 1998

(30) Foreign Application Priority Data

Mar. 28, 1997 (JP) ............................................. 9-077831

(51) Int. Cl.[7] ............................................. H04B 10/00
(52) U.S. Cl. ....................... 359/172; 359/152; 359/154; 359/163
(58) Field of Search ................................. 359/152, 154, 359/163, 172; 385/14

(56) References Cited

U.S. PATENT DOCUMENTS 5,786,921 A * 7/1998 Wang et al. ................. 359/152

FOREIGN PATENT DOCUMENTS

JP 6-237285 8/1994
JP 8-195785 7/1996

* cited by examiner

Primary Examiner—Kinfe-Michael Negash
(74) Attorney, Agent, or Firm—Arent Fox Kintner Plotkin & Kahn, PLLC (57) ABSTRACT An IrDA modulation/demodulation integrated circuit device modulates and demodulates a signal by an IrDA-complying method that meets the SIR standards. The IrDA modulation/demodulation integrated circuit device has a CRC block for performing calculation on data consisting of A, C, and I fields to calculate an FCS and appending an FCS field to the data, a data transparency control block for performing data transparency control for transmission on the data output therefrom, and a flag block for adding a BOF flag and an EOF flag at the head and the tail, respectively, of the data obtained therethrough. The IrDA modulation/demodulation integrated circuit device also has a flag block for removing the BOF and EOF flags from a demodulated signal, a data transparency control block for performing data transparency control on the basis of the data output therefrom, and a CRC block for checking for a transfer error by checking the value in the FCS field.

4 Claims, 7 Drawing Sheets

IRDA MODULATION/DEMODULATION INTEGRATED CIRCUIT DEVICE

TECHNICAL FIELD

The present invention relates to an IrDA modulation/demodulation integrated circuit device that is used to perform infrared communication by a method complying with IrDA (Infrared Data Association), and particularly to an IrDA modulation/demodulation integrated circuit device that performs infrared communication by an IrDA-complying method that meets the SIR (serial infrared) standards.

BACKGROUND ART

Figure 8:
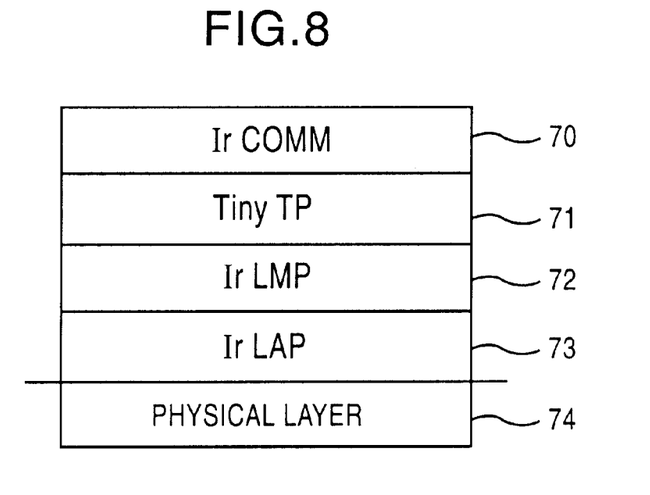
FIG. 8 is a diagram illustrating a communication control process performed in an IrDA-complying method.

A conventional IrDA modulation/demodulation integrated circuit device will be described with reference to FIGS. 8 and 9. FIG. 8 is a hierarchy diagram illustrating a communication control process performed in an IrDA-complying method. For example, consider a case where a signal that serially conveys data, such as an RS-232C signal, is transmitted by infrared rays. First, the signal that serially conveys data is received by a layer called IrCOMM 70. Next, a layer called TinyTP 71 performs flow control so that signal transmission will be suspended when, for example, the buffer capacity becomes insufficient. A layer called IrLMP (infrared link management protocol) 72 performs management of, for example, communication destinations when communicating with more than one communication destination.

A layer called IrLAP (infrared link access protocol) 73 produces a signal for transmission and transfers it to a layer called the physical layer 74. This signal is modulated by the physical layer 74 and is then, by the use of a light-emitting diode or the like, transmitted as radiation of infrared rays. Whereas IRCOMM 70, TinyTP 71, IrLMP 72, and IrLAP 73 are realized as software, the physical layer 74 is realized as hardware. On the other hand, when a signal is received from the outside as radiation of infrared rays, it is sensed by the use of a photodiode or the like, is then demodulated by the physical layer 74, and is then transferred to IrLAP 73. The signal is then processed by IrLAP 73, IrLMP 72, TinyTP 71, and IrCOMM 70 so that necessary data will be extracted from the signal.

Figure 9:
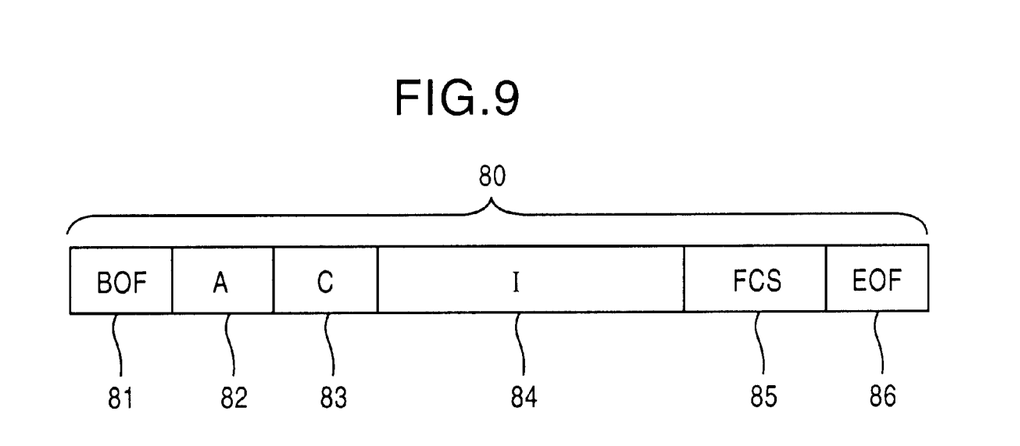
FIG. 9 is a diagram illustrating the composition of a frame used in an IrDA-complying method.

The composition of a frame according to the SIR standards is shown in FIG. 9. An IrDA-complying method achieves half-duplex communication, using a frame 80 as a unit of data transfer. A frame 80 is composed of, from its head end, a BOF (beginning of frame) flag 81, an address (A) field 82, a control (C) field 83, an information (I) field 84, a frame check sequence (FCS) field 85, and an EOF (end of frame) flag 86.

The BOF flag 81 is a flag indicating the start of a frame, and its value is defined by $(C0)_{16}$. Note that the figures placed after the closing parenthesis represents the base number. The next field, i.e. the A field 82, is an eight-bit field used to identify a communication partner. The next field, i.e. the C field 83, is an eight-bit field used to define the function of the frame 80.

The next field, i.e. the I field 84, is a field for data communicated. The length of the I field is equal to a multiple of eight bits, but the frame 80 may not include any I field 84. The next field, i.e. the FCS field 85, is a 16-bit field used to check for a transfer error by a CRC (cyclic redundancy check) method. The EOF flag is a flag indicating the end of the frame 80, and its value is defined by $(C1)_{18}$.

According to the SIR standards, an IrDA modulation/demodulation integrated circuit device is supposed to create a frame 80 on a software basis when transmission is performed. Specifically, IrLAP 73 (see FIG. 8) performs calculation on the data of the A, C, and I fields 82 to 84 to calculate a frame check sequence by a 16-bit CRC-CCITT (described later) method, and then appends the result to the end of the data. Thereafter, IrLAP 73 performs data transparency control (described later) for transmission, adds the BOF flag 81 and the EOF flag 86 to the data, and then transfers the data to the physical layer 74. The physical layer 74 modulates the signal conveying the frame 80, and transmits it by infrared rays.

On the other hand, when reception is performed, the physical layer 74 demodulates the received signal, and then transfers it to IrLAP 73. IrLAP 73 recognizes the BOF flag, recognizes the following one byte as the A field, recognizes the following one byte as the C field, and then recognizes the start of the I field. When IrLAP 73 recognizes the EOF flag, it recognizes the two bytes immediately before the EOF flag as the FCS field, and recognizes the data following the C field and preceding the FCS field as the I field. Thereafter, IrLAP 73 performs data transparency control (described later) for reception, and, for example, checks for a transfer error by checking the value in the FCS field.

However, in this conventional IrDA modulation/demodulation integrated circuit device, calculation of the frame check sequence, data transparency control, and other operations are performed on a software basis, and thus require considerably high computing performance. This may not lead to a serious problem on a personal computer or the like incorporating a high-performance CPU, but, on a portable appliance or on a peripheral device for use with a personal computer, requires its CPU to operate near the limits of its performance, leaving no extra power for other operations, or even above the limits of its performance, making it impossible to perform desired operations properly.

DISCLOSURE OF THE INVENTION

An object of the present invention is to provide an IrDA modulation/demodulation integrated circuit device that performs less operations on a software basis.

To achieve the above object, according to a first configuration of the present invention, an IrDA modulation/demodulation integrated circuit device for modulating/demodulating a signal by an IrDA-complying method that meets SIR standards is provided with: a transmission-side CRC block for performing calculation on data consisting of an address field, a control field, and an information field to calculate a frame check sequence and then appending a frame check sequence field to the data; a transmission-side data transparency control block for performing data transparency control for transmission on the data output from the transmission-side CRC block; a transmission-side flag block for adding a BOF flag and an EOF flag at the head and the tail, respectively, of the data output from the transmission-side data transparency control block; a reception-side flag block for removing the BOF flag and the EOF flag from a demodulated signal; a reception-side data transparency control block for performing data transparency control for reception on the basis of data output from the reception-side flag block; and a reception-side CRC block for checking for a transfer error by checking the value in the frame check sequence field included in the data output from the reception-side data transparency control block.

According to this configuration, when data is transmitted, the IrDA modulation/demodulation integrated circuit device, by using the transmission-side CRC block, performs calculation on data consisting of A, C, and I fields to calculate a frame check sequence. It then performs data transparency control, and then adds a BOF flag and an EOF flag to create a frame. By modulating the signal conveying this frame, the IrDA modulation/demodulation integrated circuit device transmits it by infrared rays by using a light-emitting diode or the like.

On the other hand, when data is received, the IrDA modulation/demodulation integrated circuit device demodulates the signal sensed by a photodiode or the like, recognizes a frame in the signal, and eliminates therefrom the BOF and EOF flags. It then performs data transparency control for reception, and then, by using the reception-side CRC block, for example calculates the frame check sequence to check whether it coincides with the value in the FCS field appended to each frame, and thereby checks for a transfer error.

According to a second configuration of the present invention, the IrDA modulation/demodulation integrated circuit device of the first configuration described above is further provided with: a register for storing a signal for specifying the number of BOF flags added at the head of a frame. Here, in accordance with the signal from the register, the transmission-side flag block adds more than one BOF flag to the frame.

In an IrDA-complying method, additional BOFs (described later) are set by negotiation performed during communication. According to the second configuration described above, to specify the number of BOF flags, for example a parameter for specifying additional BOFs and a parameter for specifying a baud rate are stored in the above-mentioned register so that the transmission-side flag block will read information from the register and add some BOF flags if necessary when it creates a frame.

BEST MODE FOR CARRYING OUT THE INVENTION

<First Embodiment>

Figure 1:
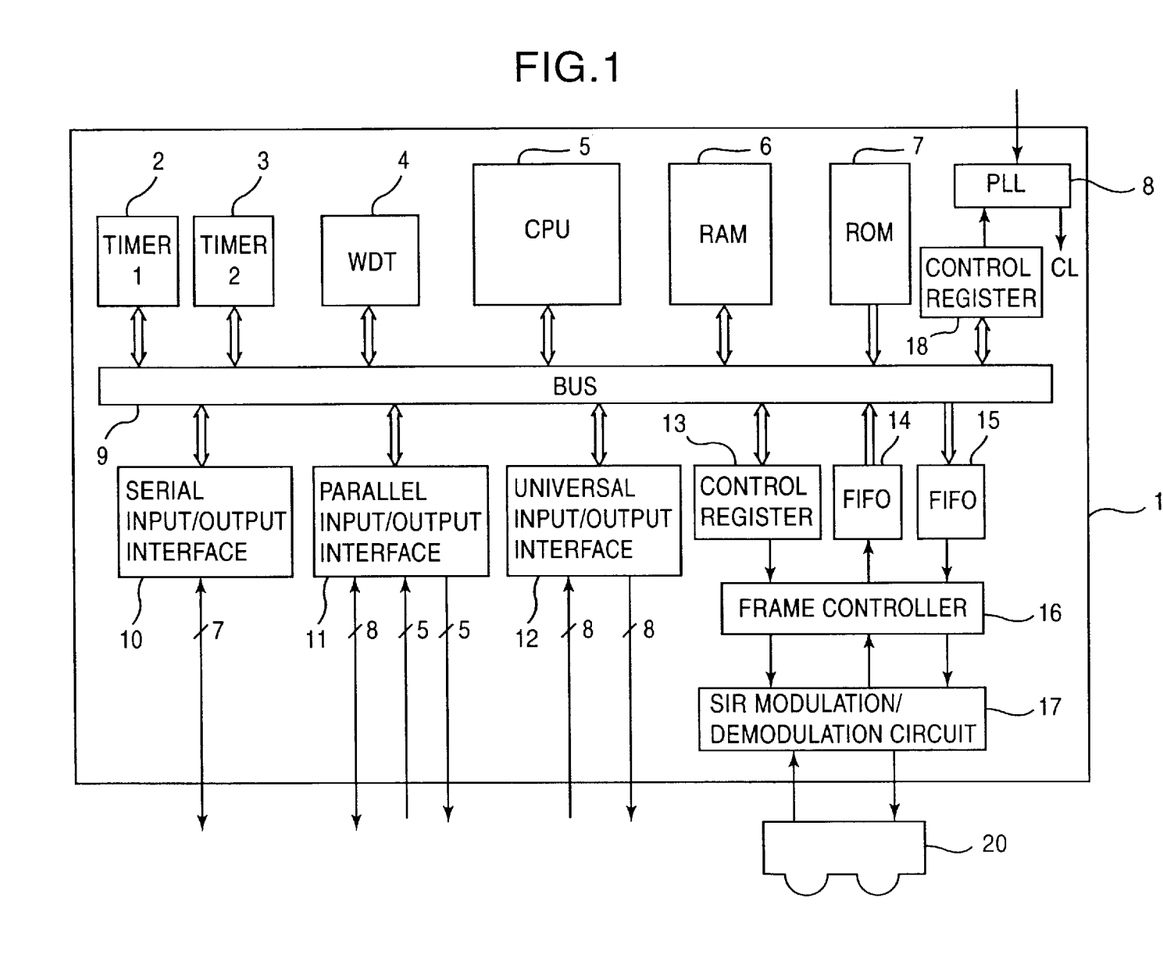
FIG. 1 is a block diagram of an IrDA modulation/demodulation integrated circuit device of a first embodiment of the present invention.

A first embodiment of the present invention will be described with reference to FIGS. 1 to 4. FIG. 1 is a block diagram of a IrDA modulation/demodulation integrated circuit device 1. The IrDA modulation/demodulation integrated circuit device 1 is used to modulate and demodulate a signal when infrared communication is performed by an IrDA-complying method. The IrDA modulation/demodulation integrated circuit device 1 is connected to an analog front end 20 for emitting and sensing infrared rays.

The analog front end 20 emits, by the use of a light-emitting diode or the like, infrared rays in accordance with the signal fed from the IrDA modulation/demodulation integrated circuit device 1, and on the other hand, when it receives, by the use of a photodiode or the like, a signal transmitted by infrared rays from an external device such as a personal computer, performs waveform shaping on the received signal and feeds it as a digital signal to the IrDA modulation/demodulation integrated circuit device 1.

The IrDA modulation/demodulation integrated circuit device 1 is provided with a PLL circuit 8 for generating a main clock CL. The PLL circuit 8 will be described later. The IrDA modulation/demodulation integrated circuit device 1 is provided with a bus 9 for transferring a signal. A CPU (central processing unit) 5 controls the entire integrated circuit device 1 and executes software programs. The software programs are stored in a ROM (read-only memory) 7.

A RAM (random-access memory) 6 is used for temporary storage of data and for other purposes. A timer 1 and a timer 2 are used by a communication protocol in an IrDA-complying method. The timer 1 is a timer for counting about 100 $\mu$sec to 26 msec, and the timer 2 is a timer for counting about 2 msec to 520 msec. A WDT (watch dog timer) 4 is a timer for counting the main clock CL multiplied by 2 to the power of 16 to 22. If the CPU 5 cannot clear the WDT 4 within this period, the CPU 5 is regarded as being in a hang-up state.

A serial input/output interface 10 is an interface, such as RS-232C, for controlling input and output of a signal that is transferred serially, and has, in this embodiment, nine transmission lines. A parallel input/output interface 11 is a centronics input/output interface, and has 8-bit transmission lines for data, 5-bit transmission lines for transmission, and 5-bit transmission lines. for reception.

A universal parallel input/output interface 12 is an input/output interface used for initial setting and status output of the integrated circuit device, and has 8-bit terminals for input and 8-bit terminals for output. A control register 13 stores communication conditions and the like, such as the baud rate.

A FIFO (first-in first-out) type buffer storage device (hereafter referred to simply as a "FIFO") 14 is used for temporary storage of the signal output from a frame controller 16. A FIFO 15 is used for temporary storage of the data that is going to be transmitted by infrared rays. A control register 18 is a register for controlling the frequency of the clock generated by the PLL circuit 8. These components 2 to 7, 10 to 15, and 18 are connected to the bus 9.

The frame controller 16 reads in data from the FIFO 15, and, by performing data transparency control for transmission and the like, creates a frame and feeds it to an SIR modulation/demodulation circuit 17. On the other hand, the frame controller 16 also performs data transparency control for reception and the like on the signal demodulated by the SIR modulation/demodulation circuit 17 and feeds it to the FIFO 14. The modulation/demodulation circuit 17 is a circuit for performing modulation/demodulation in compliance with the SIR standards; for example, it modulates a signal at a baud rate of 9600 bps and feeds it to the analog front end 20. On the other hand, the modulation/demodulation circuit 17 also demodulates the signal output from the analog front end 20 as infrared rays are sensed.

Figure 2:
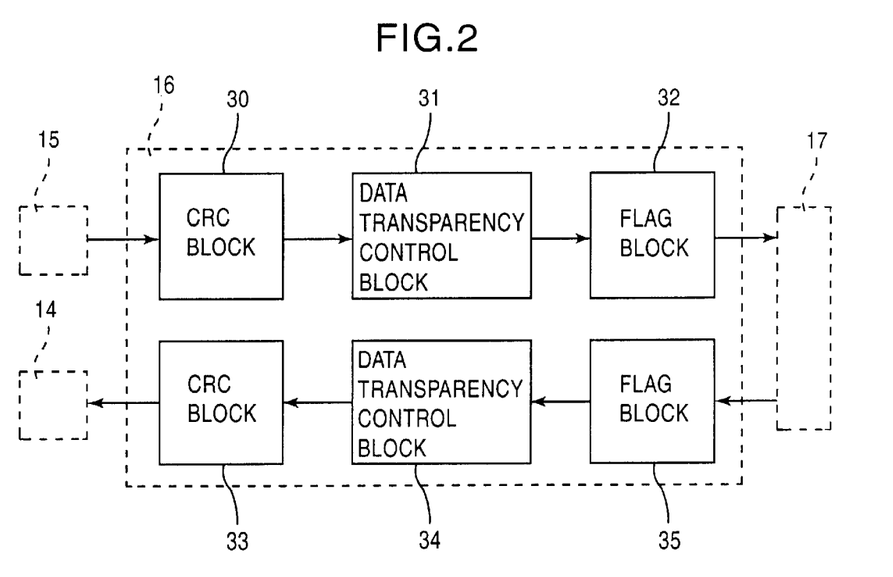
FIG. 2 is a block diagram of the frame controller of the first embodiment.

FIG. 2 shows the internal configuration of the frame controller 16. The data fed from the FIFO 15 to the frame controller 16 consists of an A field, a C field, and an I field as shown at (a) in FIG. 3.

Figure 3A:
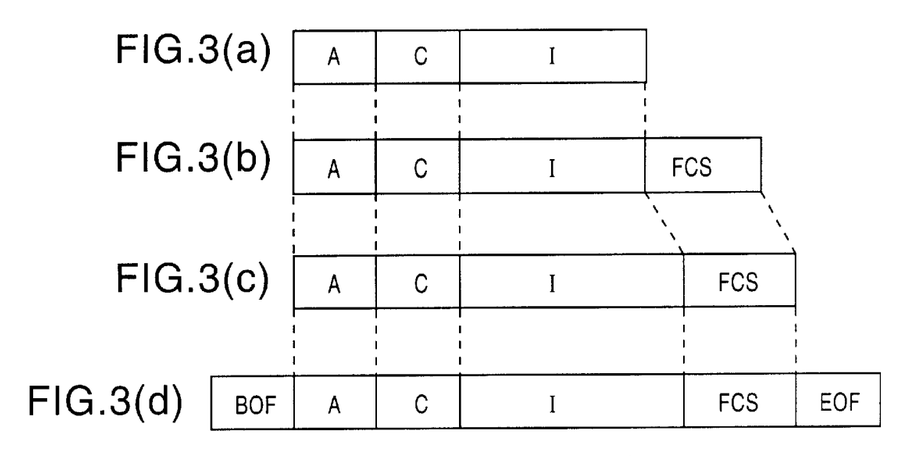
FIG. 3 is a diagram illustrating how data is converted into a frame in the first embodiment.

In the frame controller 16, a transmission-side CRC block 30 calculates a frame check sequence, and appends it to the end of the I field as shown at (b) in FIG. 3. The frame check sequence is calculated by a 16-bit CRC-CCITT (International Consultative Committee for Telephone and Telegraph) method.

This calculation is performed as follows. First, the data consisting of the A, C, and I fields is arranged in order of transfer, and is then multiplied by 2 to the power of 16. Next, the resultant value is divided by a generator polynomial $X^{16}+X^{12}+X^5+1$ without moving the places of figures. Then, the row of the factors of the individual terms of the polynomial representing the residue is determined as the value of the FCS field.

Next, a transmission-side data transparency control block 31 performs data transparency control for transmission on the data of the A through FCS fields. According to the SIR standards, within a frame, a BOF flag $(C0)_6$, an EOF flag $(C1)_{16}$, and a control escape $(7D)_{16}$ are used for special purposes. For this reason, the data transparency control block 31 converts $(C0)_{16}$, $(C1)_{16}$, and $(7D)_{16}$ included in the A, C, I, and FCS fields as follows.

C0→7D E0
C1→7D E1
7D→7D 5D

This conversion is achieved as follows. When a one-byte data $(C0)_{16}$, $(C1)_{16}$, or $(7D)_{16}$ is encountered, the exclusive OR between that data and $(20)_{16}$ is calculated, and a control escape $(7D)_{16}$ is inserted before the resultant data. This may result in making the frame a little larger after data transparency control as shown at (c) in FIG. 3.

Then, a transmission-side flag block 32 adds a BOF flag $(C0)_{16}$ at the head of the frame and an EOF flag $(C1)_{16}$ at the tail of the frame as shown at (d) in FIG. 3, and then feeds the frame to the modulation/demodulation circuit 17.

On the other hand, when the signal demodulated by the modulation/demodulation circuit 17 is fed to the frame controller 16, first, a reception-side flag block 35 recognizes a frame in the signal by detecting the BOF flag $(C0)_{16}$ and the EOF flag $(C1)_{16}$ included therein. It then removes the BOF flag $(C0)_{16}$ and the EOF flag $(C1)_{16}$ from the frame as shown at (c) in FIG. 3, and then feeds the frame to a reception-side data transparency control block 34. The data transparency control block 34 performs data transparency control for reception. The data transparency control block 34 performs conversion as follows.

7D E0→C0
7D E1→C1
7D 5D→7D

This conversion is achieved as follows. When a control escape $(7D)_{16}$ is encountered, the $(7D)_{16}$ is removed, and the exclusive OR between the next one-byte data $(E0)_{16}$, $(E1)_{16}$, or $(5D)_{16}$ and $(20)_{16}$ is calculated. As a result, the data restores its state before data transparency control for transmission.

A reception-side CRC block 33 reads, as the FCS field, the value of the last 16 bits of the data fed thereto from the data transparency control block 34. Then, the CRC block 33 calculates the frame check sequence of the remaining A, C, and I fields, and checks whether it coincides with the value in the FCS field.

If the two values coincide, the CRC block 33 outputs data consisting of an A field, a C field, and an I field as shown at (a) in FIG. 3 to the FIFO 14. If the two values do not coincide, the CRC block 33 recognizes that a transfer error has occurred, and thus outputs an error signal. In response to this error signal, for example, the CPU 5 (see FIG. 1) controls the integrated circuit device 1 to request the communication partner to send the data once again.

In this configuration, when a signal fed to either of the input/output interfaces 10 and 11 (see FIG. 1) is transmitted by infrared rays, the IrDA modulation/demodulation integrated circuit device 1 simply needs to create data consisting of an A field, a C field, and an I field as shown at (a) in FIG. 3 on a software basis and then store it in the FIFO 15 by way of the bus 9. Then, the frame controller 16, which is a piece of hardware, reads in the data from the FIFO 15, creates a frame as shown at (d) in FIG. 3, and feeds it to the modulation/demodulation circuit 17. The frame is then subjected to modulation by the modulation/demodulation circuit 17, and is then transmitted from the analog front end 20.

On the other hand, when a signal is received by infrared rays, the frame controller 16 performs data transparency control and the like on the signal demodulated by the modulation circuit 17, checks for a transfer error, and then stores data consisting of an A field, a C field, and an I field as shown at (a) in FIG. 3 in the FIFO 14. This data is analyzed on a software basis by the IrDA modulation/demodulation integrated circuit device 1, and the resulting signals are output from the interfaces 10 to 13.

In a conventional IrDA modulation/demodulation integrated circuit device, the operations performed in the frame controller 16 are performed on a software basis in compliance with the SIR standards. By contrast, in the IrDA modulation/demodulation integrated circuit device 1 of this embodiment, the same operations are performed on a hardware basis, and thus less operations need to be performed on a software basis. Moreover, the IrDA modulation/demodulation integrated circuit device 1 of this embodiment requires smaller-scale software than a conventional one, and thus requires smaller chip areas on the ROM 7 and the RAM 6. The operations performed by the frame controller 16 are easy to handle on a hardware basis, and therefore the frame controller 16 requires almost no increase in the chip area. As compared with how the chip areas on the ROM 7 and the RAM 6 are reduced, the increase in the gate area is far smaller. Moreover, the transmission side and the reception side operate independently of each other, and therefore it is possible to obtain a modulation integrated circuit device that operates only during transmission and a demodulation integrated circuit device that operates only during reception.

Next, the PLL circuit 8 will be described. If an IrDA modulation/demodulation integrated circuit device to be incorporated into a portable telephone is so configured as to generate a main clock CL by being connected to a crystal resonator dedicated thereto, an extra crystal resonator needs to be incorporated in the portable telephone at extra cost.

Figure 4:
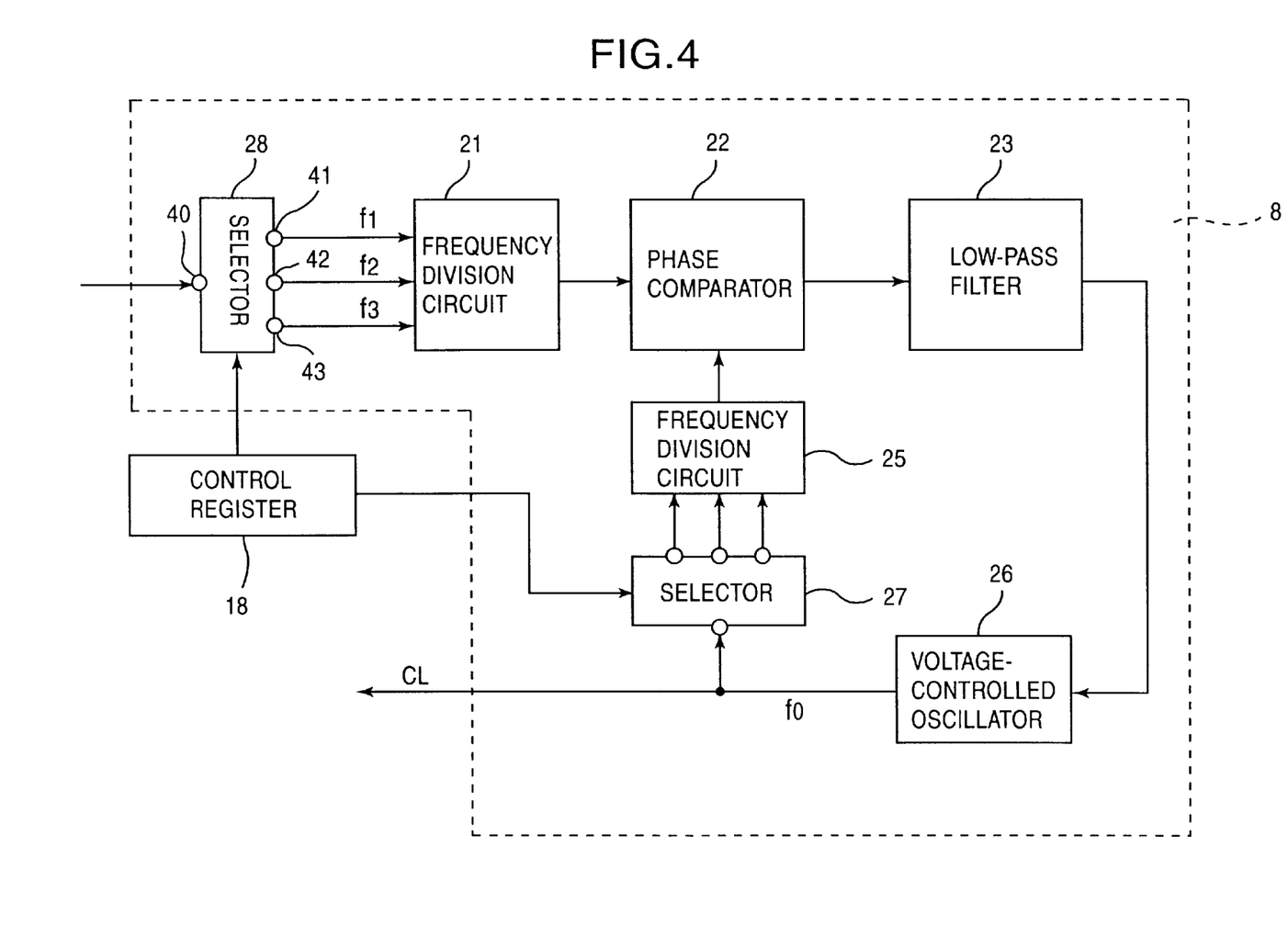
FIG. 4 is a block diagram of the PLL circuit of the first embodiment.

To avoid this, the IrDA modulation/demodulation integrated circuit device 1 of this embodiment is provided with a PLL circuit 8 so that it can take in a clock signal from a base-band integrated circuit device (not shown), which is also incorporated in the portable telephone, and produce a main clock CL from this clock signal by converting its frequency by the use of frequency division circuits 21 and 25 (see FIG. 4). The base-band integrated circuit device is an integrated circuit device for processing a base-band signal by performing, for example, encoding and decoding of sounds. This helps reduce the number of crystal resonators that need to be incorporated in a portable telephone, and thereby reduce the cost thereof. Moreover, it is also possible to reduce the area of the circuit board on which to mount the crystal resonators, and thereby make the portable telephone compact.

FIG. 4 is a block diagram showing the PLL circuit 8 in more detail. The clock used in the base-band integrated circuit device is fed to the PLL circuit 8, where the clock is first fed to a terminal 40 of a selector 28. In the selector 28, one of three terminals 41 to 43 is selected by the control register 18 as the destination to which to feed the clock.

For example, when the clock has a frequency of 12.6 MHz, the clock is fed to the terminal 41; when the clock has a frequency of 12.8 MHz, the clock is fed to the terminal 42; when the clock has a frequency of 14.4 MHz, the clock is fed to the terminal 43. Thus, the frequency of the clock fed out via the terminals 41 to 43 is f1=12.6 MHz, f2=12.8 MHz, and f3=14.4 MHz, respectively. Moreover, when the control register 18 switches the selector 28, it simultaneously switches also a selector 27 so that different signal paths are used in accordance with the clock frequency.

The frequency division circuit 21 provided in the stage following the selector 28 divides the frequency of the clock by a factor of n. The frequency division circuit 21 uses different values of n for the three clock frequencies f1 to f3. The signal that has undergone frequency division is then fed to a phase comparator 22. The phase comparator 22 detects a phase difference between the signal output from the frequency division circuit 21 and the signal output from the frequency division circuit 25. A low-pass filter 23 eliminates a high-frequency component from the output of the phase comparator 22, and feeds the resulting signal to a voltage-controlled oscillator 26.

The voltage-controlled oscillator 26 outputs the clock CL while varying the oscillation frequency f0 in such a way as to decrease the above-mentioned phase difference. Moreover, the clock CL is fed, by way of one of signal paths selected by the selector 27, to the frequency division circuit 25. In the frequency division circuit 25, the frequency of the clock is divided by a factor of m (where m is a whole number), using the corresponding value of m among those set for the individual signal paths. Thereafter, the clock is fed to the phase comparator 22.

The switching of the selectors 27 and 28 is controlled by the control register 18. For example, in the frequency division circuits 21 and 25, whole numbers n and m that satisfy a relation m/n=512/875 are set when the clock frequency of the base-band integrated circuit device is 12.6 MHz, whole numbers m and n that satisfy a relation m/n=72/125 are set when the clock frequency is 12.8 MHz, and whole numbers m and n that satisfy a relation m/n=64/125 are set when the clock frequency is 14.4 MHz. As a result, from different clock frequencies of the base-band integrated circuit device, a clock CL having a frequency of f0=7.3728 MHz is produced.

There is a limited choice of frequencies as the frequency of the clock used in the base-band integrated circuit device. However, the clock frequency used in integrated circuit devices and the like other than the base-band integrated circuit device, for example a telephone CPU (not shown) for controlling the entire portable telephone, is not standardized. Thus, a configuration having selectors 27 and 28 cannot cope with so many clock frequencies. In addition, there is a possibility that the clock frequency of the telephone CPU or the like will be changed to obtain better performance or the like.

In the base-band integrated circuit device, since there is a limited choice of frequencies as the clock frequency, simply by designing the selectors 27 and 28 to cope with three frequencies, it is possible to cope with many types of base-band integrated circuit device. Moreover, since the base-band integrated circuit device is for processing a base-band signal, it is unlikely that the clock frequency used therein is changed so often.

In an IrDA-complying method, when communication is attempted, first, a communication partner is called up by a discovery process. Next, the baud rate, the data size of the I field, and other parameters are specified by a negotiation process, and then communication is started. According to IrDA 1.0 (version 1.0), a baud rate in the range from 2400 bps to 1152000 bps is used, and therefore, to ensure easy handling of the clock, it is preferable to set its frequency equal to a whole number times 115.2 kHz. Similarly, according to IrDA 1.1 (version 1.1), a baud rate of 0.576 Mbps, 1.152 Mbps, or 4 Mbps is used, and therefore it is preferable to set the clock frequency equal to a whole number times the frequency corresponding to one of those baud rates.

By designing the IrDA modulation/demodulation integrated circuit device 1 to be started when the analog front end 20 outputs a signal on sensing infrared rays, it is possible to reduce the electric power consumption of the portable telephone. By exploiting the fact that communication is performed at 9600 bps in the discovery process, it is possible to set the clock CL automatically by switching the selectors 27 and 28 on failure of communication in the discovery process. The IrDA modulation/demodulation integrated circuit device 1 may incorporate other functions of the portable telephone.

<Second Embodiment>

Figure 5:
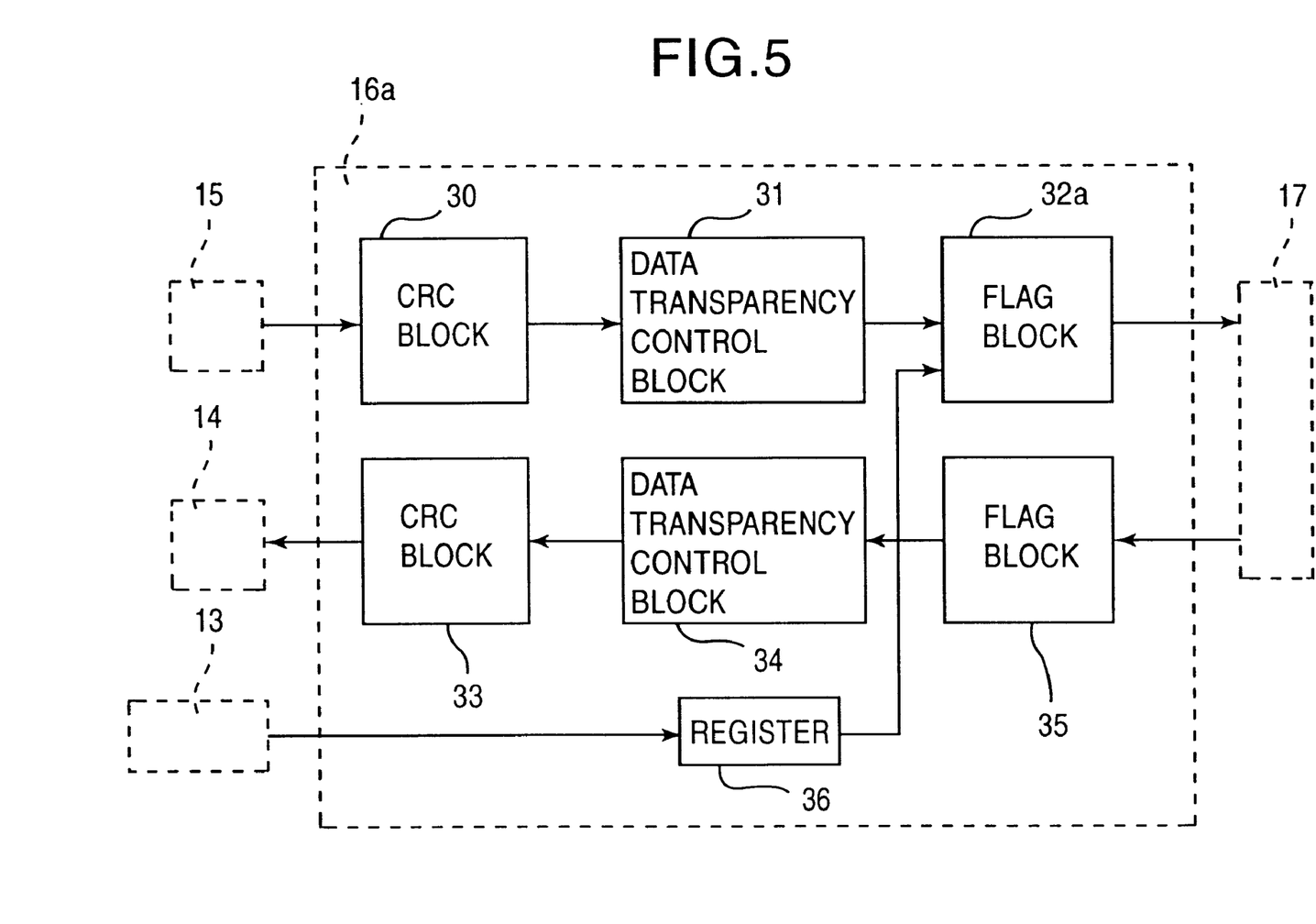
FIG. 5 is a block diagram of the frame controller of a second embodiment of the present invention.
Figure 6A:
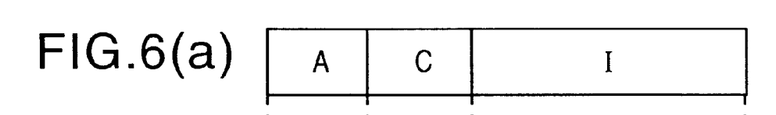
FIG. 6 is a diagram illustrating how data is converted into a frame in the second embodiment.
Figure 6B:
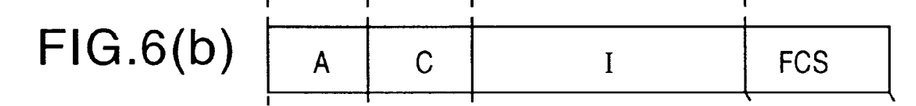
Figure 6C:
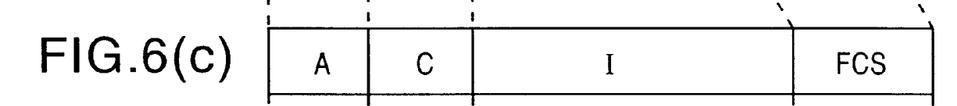
Figure 6D:
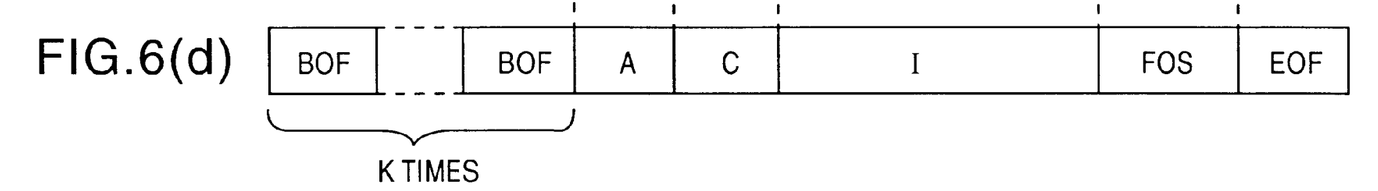

A second embodiment of the present invention will be described with reference to FIGS. 5 and 6. According to the SIR standards, the number of BOF flags to be added at the head of a frame as shown at (d) in FIG. 6 is set in the negotiation process. A number k−1 of BOF flags that are added to the original BOF flag are called "additional BOFs".

The main purpose of additional BOFs is to secure a delay from the BOF flag at the head to the A field in a case where communication is performed with a device that takes time to start operation after detecting the BOF flag at the head. Note that what is shown at (a) to (c) in FIG. 6 is the same as what is shown at (a) to (c) in FIG. 3, and therefore overlapping descriptions will not be repeated.

In a conventional IrDA modulation/demodulation integrated circuit device, the operations performed to handle additional BOFs are also performed on a software basis in compliance with the SIR standards. However, by performing those operations on a hardware basis as shown in FIG. 5, less operations need to be performed on a software basis. FIG. 5 shows a frame controller 16a that corresponds to the frame controller 16 shown in FIG. 1, and the former is different from the latter only in having an additional register 36 and having a differently operating flag block 32a. Therefore, in FIG. 5, such elements as are found also in FIG. 2 are identified with the same reference numerals, and overlapping descriptions will not be repeated.

The register 36 provided within the frame controller 16a is used by the control register 13 or directly by software to store, for example in the negotiation process, the parameter for specifying additional BOFs and the parameter for specifying the baud rate. On the basis of these two parameters stored in the register 36, the transmission-side flag block 32a determines the number of additional BOFs required, and adds a number k of BOF flags at the head of the data shown at (c) in FIG. 6 and an EOF flag at the tail thereof. As a result, a frame as shown at (d) in FIG. 6 is created, and is then fed to the modulation/demodulation circuit 17.

On the other hand, the reception-side flag block 35 recognizes the BOF flags and the EOF flag included in the signal fed thereto from the modulation/demodulation circuit 17, and removes the number k of BOF flags added at the head of the frame and the EOF flag added at the tail thereof. This permits the frame controller 16a to process the frame in accordance with the additional BOFs. The additional BOFs are set as shown in Table 1.

TABLE 1

| Baud Rate | 48 BOFs | 24 BOFs | 12 BOFs | 6 BOFs | 3 BOFs | 2 BOFs | 1 BOF | 0 BOFs |
|---|---|---|---|---|---|---|---|---|
| 2400 | 1 | 0 | 0 | 0 | 0 | 0 | 0 | 0 |
| 9600 | 4 | 2 | 1 | 0 | 0 | 0 | 0 | 0 |
| 19200 | 8 | 4 | 2 | 1 | 0 | 0 | 0 | 0 |
| 38400 | 16 | 8 | 4 | 2 | 1 | 0 | 0 | 0 |
| 57600 | 24 | 12 | 6 | 3 | 1 | 1 | 0 | 0 |
| 115200 | 48 | 24 | 12 | 6 | 3 | 2 | 1 | 0 |

For example, addition of 12 BOF flags at a baud rate of 115200 bps and addition of six BOF flags at a baud rate of 57600 bps are specified by an identical parameter. That is, the parameter represents the delay time secured by additional BOFS. Thus, setting the baud rate results in determining the number k of BOF flags. Accordingly, a parameter specifying the baud rate and a parameter specifying the delay time are stored in the register 36. Alternatively, it is also possible to determine the number of additional BOFs by software or the like and then store the obtained value in the register 36.

<Third Embodiment>

Figure 7:
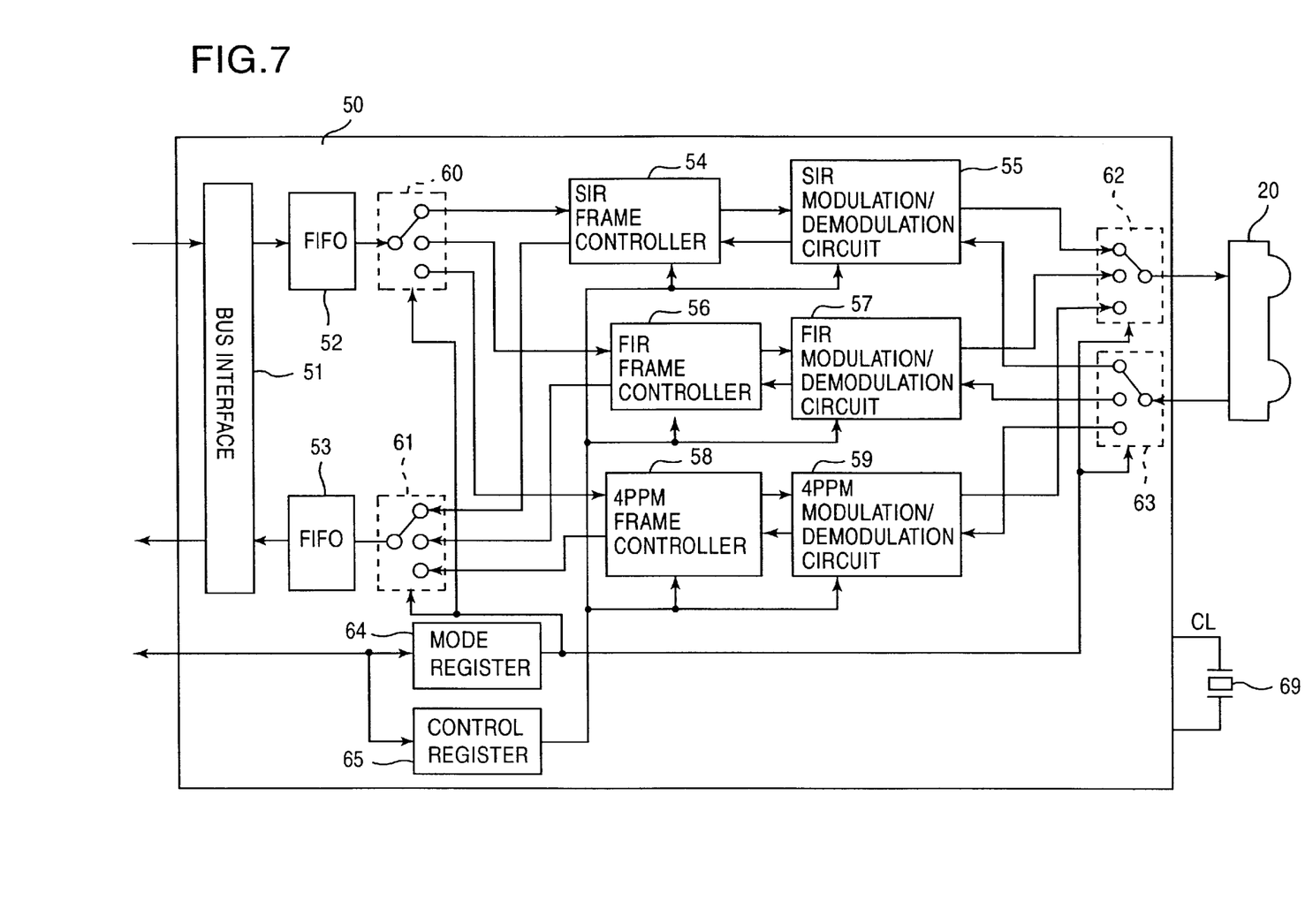
FIG. 7 is a block diagram of an IrDA modulation/demodulation integrated circuit device of a third embodiment of the present invention.

FIG. 7 is a block diagram of the IrDA modulation/demodulation integrated circuit device 50 of a third embodiment of the present invention. Whereas the first and second embodiments described above can cope only with an IrDA-complying method that meets the SIR standards, the IrDA modulation/demodulation integrated circuit device 50 can cope with not only the SIR standards, but also the FIR (fast infrared) standards and the 4PPM (four pulse position modulation) standards. The IrDA modulation/demodulation integrated circuit device 50 is connected to a bus (not shown) that is provided externally. The IrDA modulation/demodulation integrated circuit device 50 can produce a main clock CL also by the use of a crystal resonator 69.

The data that is going to be transmitted by infrared rays is taken into the integrated circuit device 50 by a bus interface 51 by way of the bus that is provided outside the integrated circuit device 50. The data thus taken in is stored temporarily in a FIFO 52. The data taken into this integrated circuit device 50 consists of an A field, a C field, and an I field. On the output side of the FIFO 52 is provided a selector 60, of which the destination of output is selected by a mode register 64.

The mode register 64 selects a communication method from among those which comply with the SIR, FIR, and 4PPM standards. FIG. 7 shows a case where modulation and demodulation are performed in compliance with the SIR standards. When the mode register 64 requests that operations be performed in compliance with the SIR standards, the data stored in the FIFO 52 is fed through the selector 60 to a SIR frame controller 54. The SIR frame controller 54 has the same configuration as the frame controller 16 shown in FIG. 2, and thus, during transmission, performs calculation of the frame check sequence, data transparency control, and addition of BOF and EOF flags.

The SIR frame controller 54 is connected to an SIR modulation/demodulation circuit 55. The SIR modulation/demodulation circuit 55 performs modulation and demodulation using the baud rate and other parameters specified in the control register 65. The SIR frame controller 54 creates a signal conveying a frame, and the SIR modulation/demodulation circuit 55 modulates this signal and feeds it to a selector 62. The signal is then fed through the selector 62 to the analog front end 20, and is therefrom transmitted as infrared rays.

On the other hand, when the analog front end 20 receives infrared rays, it feeds a signal to the IrDA modulation/demodulation integrated circuit device 50. This signal is first fed to a selector 63. The selector 63 is controlled by the mode register 64 so that, when set for the SIR standards, it will feed the signal to the SIR modulation/demodulation circuit 55, where the signal is demodulated.

Next, the SIR frame controller 54 removes the BOF and EOF flags, performs data transparency control, and checks for a transfer error. It then feeds the data to a selector 61. This data consists of an A field, a C field, and an I field as shown at (a) in FIG. 3. The data output from the SIR frame controller 54 is stored in a FIFO 53 through the selector 61. This data is fed out from the FIFO 53 to the above-mentioned bus by the bus interface 51.

The data is then processed on a software basis by a CPU (not shown) or the like connected to this bus. The signal specifying the standards used, i.e. the SIR, FIR, or 4PPM standards, is fed from the outside by way of the above-mentioned bus, and is stored in the mode register 64. The baud rate and other parameters are also fed from the outside, and are stored in the control register 65.

When the mode register 64 specifies the FIR standards, during transmission, data is fed from the FIFO 52 through the selector 60 to a FIR frame controller 56. the FIR frame controller 56 creates a frame and feeds it to a FIR modulation/demodulation circuit 57. The FIR modulation/demodulation circuit 57 modulates the signal, and feeds the modulated signal through the selector 62 to the analog front end 20.

On the other hand, during reception, the analog front end 20 feeds a signal through the selector 63 to the FIR modulation/demodulation circuit 57. The FIR modulation/demodulation circuit 57 demodulates the signal and feeds it to the FIR frame controller 56. The FIR frame controller 56 checks for a transfer error, and then stores the data in the FIFO 53 through the selector 61.

When the mode register 64 specifies the 4PPM standards, during transmission, data is fed from the FIFO 52 through the selector 60 to a 4PPM frame controller 58. the 4PPM frame controller 58 creates a frame and feeds it to a 4PPM modulation/demodulation circuit 59. The 4PPM modulation/demodulation circuit 59 modulates the signal, and feeds the modulated signal through the selector 62 to the analog front end 20.

On the other hand, during reception, the analog front end 20 feeds a signal through the selector 63 to the 4PPM modulation/demodulation circuit 59. The 4PPM modulation/demodulation circuit 59 demodulates the signal and feeds it to the 4PPM frame controller 58. The 4PPM frame controller 58 checks for a transfer error, and then stores the data in the FIFO 53 through the selector 61.

The SIR, FIR, and 4PPM standards use different frame compositions, different data transparency control methods, etc. Therefore, the frame controller 54, 56, and 58 on the one hand, and the modulation/demodulation circuits 55, 57, and 59 on the other hand, cannot be formed into a common block. For example, according to the FIR standards, the value of the flag indicating the head of a frame is (01111110)

$_2$, and in addition two of them are required; the value of the flag indicating the tail of a frame is $(01111110)_2$.

During transmission, data transparency control is performed in such a way that, when a $(1)_2$ appears five times consecutively, a $(0)_2$ is inserted thereafter. During reception, data transparency control is performed in such a way that, when a $(1)_2$ appears five times consecutively, the $(0)_2$ following them is removed. According to the 4PPM standards, a special pattern that never appears in data is used, and therefore no data transparency control is performed.

As for the frame check sequence, the FIR standards use a 16-bit frame check sequence based on CRC-CCITT, and the 4PP standards use a 32-bit frame check sequence based on CRC32 of IEEE (The Institute of Electrical and Electronics Engineers). The FIR and 4PPM standards demand that frame control be achieved by hardware like the frame controller 56 and 58, respectively.

By connecting the IrDA modulation/demodulation integrated circuit device 50 to a bus, and connecting a CPU or an interface to this bus, it is possible to achieve infrared communication by an IrDA-complying method. The IrDA modulation/demodulation integrated circuit device 50 generates the main clock CL by the use of the crystal resonator 69. The SIR and FIR standards use baud rates of 2.4 kbps to 115.2 kbps and 0.576 Mbps to 1.152 Mbps, respectively, and thus allow use of a common clock. On the other hand, the 4PPM standards require a clock having a frequency equal to a whole number times 4 MHz, for example 32 MHz or 48 MHz. Accordingly, it is customary to use a crystal resonator that oscillates at 32 MHz or 48 MHz, and produce a clock for the SIR and FIR standards by the use of the PLL incorporated in the integrated circuit device.

As described above, in this embodiment, the IrDA modulation/demodulation integrated circuit device 50 performs data transparency control and the like in compliance with the SIR standards, and thus less operations need to be performed on a software basis by the above-mentioned CPU or the like. It is also possible to design the SIR frame controller 54 to cope with additional BOFs, like the frame controller 16a shown in FIG. 5.

Industrial Applicability

As described above, according to the present invention, data consisting of an A field, a C field, and an I field is formed into a frame on a hardware basis, and therefore less operations need to be performed on a software basis. As a result, the CPU or the like on which software runs can perform necessary operations speedily. Now that less operations need to be performed on a software basis, it is possible to use a CPU or the like that operates at a lower frequency. Since the power consumption of a CPU or the like is roughly proportional to its operation frequency, the lower the operation frequency, the lower the power consumption. Moreover, it is possible to reduce the scale of software required, and thus reduce software development cost. Furthermore, it is possible to reduce the capacity required on the ROM for storing software, and thus reduce the chip area in the IrDA modulation/demodulation integrated circuit device that incorporates the ROM. This helps achieve cost reduction.

In addition, in a negotiation process during communication, a request for additional BOFs can be handled by adding a desired number of BOF flags on a hardware basis, and thus no extra operations need to be performed on a software basis.

Offering the advantages as described above, an IrDA modulation/demodulation integrated circuit device according to the present invention is suitable for use in a portable telephone or the like.

What is claimed is:

1. An IrDA modulation/demodulation integrated circuit device for modulating/demodulating a signal by an IrDA-complying method that meets SIR standards, comprising:

a transmission-side CRC block for performing calculation on data consisting of an address field, a control field, and an information field to calculate a frame check sequence and then appending a frame check sequence field to the data;

a transmission-side data transparency control block for performing data transparency control for transmission on data output from the transmission-side CRC block;

a transmission-side flag block for adding a BOF flag and an EOF flag at a head and a tail, respectively, of data output from the transmission-side data transparency control block;

a reception-side flag block for removing the BOF flag and the EOF flag from a demodulated signal;

a reception-side data transparency control block for performing data transparency control for reception on a basis of data output from the reception-side flag block; and a reception-side CRC block for checking for a transfer error by checking a value in the frame check sequence field included in data output from the reception-side data transparency control block.

2. An IrDA modulation/demodulation integrated circuit device as claimed in claim 1, further comprising:

a register for storing a signal for specifying a number of BOF flags added at a head of a frame, wherein, in accordance with the signal from the register, the transmission-side flag block adds more than one BOF flag to the frame.

3. An IrDA modulation integrated circuit device for modulating a signal by an IrDA-complying method that meets SIR standards, comprising:

a transmission-side CRC block for performing calculation on data consisting of an address field, a control field, and an information field to calculate a frame check sequence and then appending a frame check sequence field to the data;

a transmission-side data transparency control block for performing data transparency control for transmission on data output from the transmission-side CRC block; and a transmission-side flag block for adding a BOF flag and an EOF flag at a head and a tail, respectively, of data output from the transmission-side data transparency control block.

4. An IrDA demodulation integrated circuit device for demodulating a signal by an IrDA-complying method that meets SIR standards, comprising:

a reception-side flag block for removing a BOF flag and an EOF flag from a demodulated signal;

a reception-side data transparency control block for performing data transparency control for reception on a basis of data output from the reception-side flag block; and a reception-side CRC block for checking for a transfer error by checking a value in a frame check sequence field included in data output from the reception-side data transparency control block.

* * * * *